(No Model.)
J. F. MEHREN.
ELECTRIC CURRENT INDICATOR.
No. 414,866. Patented Nov. 12, 1889.
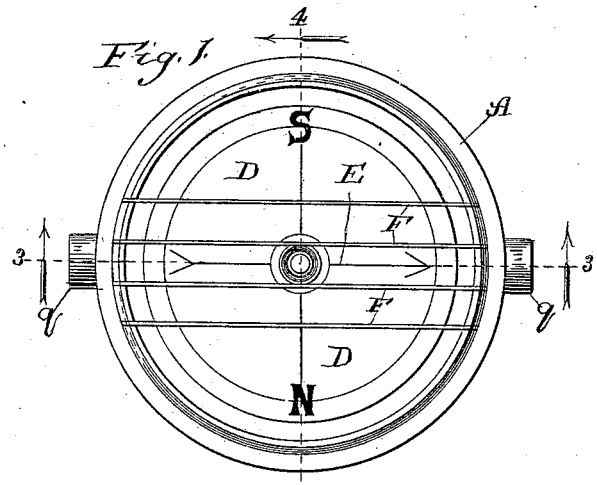
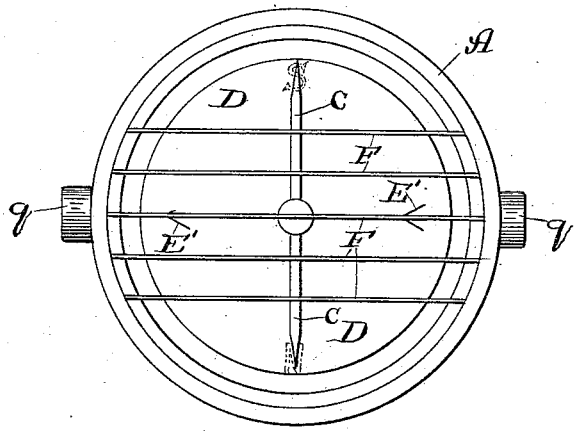
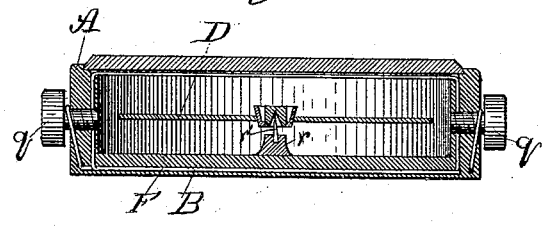
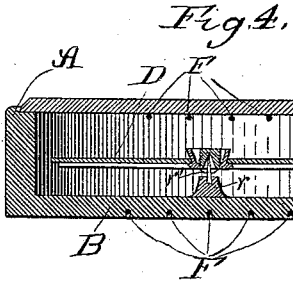
Witnesses:
Clifford N. White.
J. W. Dyrenforth.
Inventor:
Jacob F. Mehren,
By Dyrenforth and Dyrenforth
Atty's.

United States Patent Office.

JACOB F. MEHREN, OF CHICAGO, ILLINOIS.

ELECTRIC-CURRENT INDICATOR.

SPECIFICATION forming part of Letters Patent No. 414,866, dated November 12, 1889.

Application filed January 26, 1889. Serial No. 297,654. (No model.)

*To all whom it may concern:*

Be it known that I, JACOB F. MEHREN, a citizen of the United States, residing at Chicago, in the county of Cook and State of Illinois, have invented a new and useful Improvement in Electric-Current Indicators, of which the following is a specification.

The object of my invention is to provide a device which may be carried in the pocket to serve as a readily-accessible and convenient means for showing the direction of an electric current on a wire or as a galvanometer to enable tests to be made of weak currents, or both as an indicator of the direction and force of electric currents.

To these ends my invention consists in a compass having a pointer connected with the poised magnetic needle and extending between its extremities.

It also consists in a compass having a pointer connected with and extending between the extremities of the poised magnetic needle, and having wire wound around the case in two or more turns, which are spread apart across the top of the case to avoid obstructing the view of the needle; and it further consists in details of construction and combinations of parts.

In the accompanying drawings, Figure 1 is a top plan view of my improved indicator; Fig. 2, a bottom plan view of the same, showing a modification; and Figs. 3 and 4 are sectional views taken at right angles to each other, respectively, on the lines 3 3 and 4 4 of Fig. 1.

A is the case of the indicator, formed of any one of various materials, though preferably of an insulating material, and the base B of which may be opaque and integral with the case, or formed of glass, when, if the wall of the case be of hard rubber or material other than glass, the base is of course not integral with it. The post $r$ in the case has poised upon the pointed support $r'$, sustained by the post, the ordinary magnetic needle C, and between the extremities of the needle I provide a pointer E, which may be in the form of an arrow, extending on one side of the needle midway between its extremities, or on both sides of the needle, as shown. I prefer to provide the pointer E in the manner illustrated in Fig. 1—namely, by securing a dial or disk D, formed of paper or, and preferably, of a light metal, (aluminium,) on the needle, and marking thereon the pointer E, and at opposite points coinciding with or near the extremities of the needle the signs "N" and "S," indicating polarity.

The manner of use and purpose of the device, constructed as thus far explained, are as follows: By imposing the instrument on a wire upon which an electric current is flowing the needle C will be deflected in a well-known manner, though if the pointer were not provided confusion might be occasioned as to the direction of the current, owing to the possibility, and, as practice shows, even probability, of confusion of the well-known laws governing the deflection of a magnetic needle by a current of electricity passing under or over it. By means of the pointer, however, the head of which extending, as it does, toward the "west," must turn in whichever direction the current is flowing, the possibility of confusion in the matter is obviated.

It often happens that a wire to be examined is so placed as to prevent the imposition of the instrument upon or over it, when the test to be performed has to be made by placing the instrument under it. To enable this to be done I provide a transparent (glass) base B in the case and extend (or mark on the under side of the dial) a pointer E' in the direction opposite that at which the pointer E extends, viewed from the top of the case, the opposite extension of the pointer E' being on account of the contrary effect of the current on the instrument if placed below the wire than if placed above it, as is well known.

To enable weaker currents to be tested or cause the instrument to respond readily to weaker currents, I wind around the case several turns of wire F, starting from a terminal $q$, which may be a binding-post provided at one side of the case, and passing the wire first underneath the case and ending at a similar terminal $q$, provided at the opposite side of the case, the terminals serving to connect the wire F in the circuit of a wire the current on which is to be tested. The manner of winding described will produce the same effect on the needle by passing a current through it as a current passed on a wire underneath the instrument only.

In winding the wire F around the case I take care to separate the turns or strands over the face or faces of the instrument to prevent them from obstructing the view of the dial. This is an important feature of my improvement, since, even with the four strands illustrated, (though there will commonly be at least double that number,) if they were close together, they would obstruct the view sufficiently to occasion annoyance.

Though the wire may be applied in any desired manner, provided it extends, as it should, across the case and in contact with the top and base, I prefer, for the sake of neatness, to pass it, in the manner illustrated, underneath the glass top and through perforations in the side of the case and into grooves in the bottom of the case, (which grooves may be afterward filled,) or, if the bottom be of glass, across its inner face.

As shown in the drawings, the needle is presented as extending across the wires F, the reason for so illustrating it being merely to avoid obstructing the view of the needle. When the instrument is used, however, the case should be turned to bring the wires F parallel with the needle.

What I claim as new, and desire to secure by Letters Patent, is—

1. The combination, with a compass, of a dial D, secured to the magnetic needle and having indicated upon it near each end of the needle the polarity, and a pointer E, extending between the indications of polarity, substantially as and for the purpose set forth.

2. The combination of a compass, the interior of the case of which is visible through both its upper and lower ends, and pointers E and E', connected with the needle and extending therefrom respectively in opposite directions between its extremities, substantially as and for the purpose set forth.

3. The combination of a compass, the interior of the case of which is visible through both its upper and lower ends, a dial D, secured to the magnetic needle and having indicated upon it near each end of the needle the polarity, and pointers E and E' on opposite surfaces of the dial, and extending, respectively, in opposite directions between the indications of polarity, substantially as and for the purpose set forth.

4. The combination, with a compass, of a pointer connected with and extending between the ends of the magnetic needle, and wire wound in two or more turns and secured around the case, the strands of the wire being spread apart on the side of the case through which its interior is visible, substantially as and for the purpose set forth.

5. The combination, with a compass, of a pointer connected with and extending between the ends of the magnetic needle, terminals $q$ in opposite sides of the case, and wire F, wound in two or more turns around and upon the case and connected at opposite ends with the terminals, the strands of the wire being spread apart on the side of the case through which its interior is visible, substantially as and for the purpose set forth.

6. The combination, with a compass, of a dial D, secured to the magnetic needle and having indicated upon it near each end of the needle the polarity, and a pointer E, extending between the indications of polarity, and wire F, wound in two or more turns and secured around the case, the strands of the wire being spread apart on the side of the case through which its interior is visible, substantially as and for the purpose set forth.

7. The combination of a compass having a glass top and base and terminals $q$ at its opposite sides, a dial D, secured to the magnetic needle and having indicated upon it near each end of the needle the polarity, pointers E and E' on opposite surfaces of the dial and extending, respectively, in opposite directions between the indications of polarity, and wire F, wound in two or more turns around and upon the case and connected at opposite ends with the terminals, the strands of the wire being spread apart on the opposite sides of the case, substantially as and for the purpose set forth.

JACOB F. MEHREN.

In presence of—
  M. J. BOWERS,
  J. W. DYRENFORTH.